US011535055B2

(12) United States Patent
Kuramochi et al.

(10) Patent No.: US 11,535,055 B2
(45) Date of Patent: Dec. 27, 2022

(54) METHOD OF CONFIGURING ADDITIONAL AIR CHAMBER MEMBER FOR VEHICLE WHEEL AND ADDITIONAL AIR CHAMBER MEMBER INFORMATION SYSTEM

(71) Applicant: HONDA MOTOR CO., LTD., Tokyo (JP)

(72) Inventors: Toshikatsu Kuramochi, Wako (JP); Yoichi Kamiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1209 days.

(21) Appl. No.: 16/028,580

(22) Filed: Jul. 6, 2018

(65) Prior Publication Data

US 2019/0009614 A1 Jan. 10, 2019

(30) Foreign Application Priority Data

Jul. 7, 2017 (JP) .............................. JP2017-133228

(51) Int. Cl.
  *B60B 21/12* (2006.01)
  *B60B 21/02* (2006.01)
  *B60B 17/00* (2006.01)

(52) U.S. Cl.
  CPC .............. *B60B 21/12* (2013.01); *B60B 21/02* (2013.01); *B60B 17/0017* (2013.01); *B60B 2900/111* (2013.01); *B60B 2900/112* (2013.01); *B60B 2900/113* (2013.01); *B60B 2900/131* (2013.01); *B60B 2900/133* (2013.01)

(58) Field of Classification Search
  CPC ... B60B 21/12; B60B 21/02; B60B 2900/111; B60B 2900/112; B60B 2900/113; B60B 2900/133
  See application file for complete search history.

(56) References Cited

U.S. PATENT DOCUMENTS

| 2008/0277997 A1* | 11/2008 | Kamiyama | B60C 19/002 |
| | | | 301/95.101 |
| 2011/0057505 A1* | 3/2011 | Nagata | B60B 1/06 |
| | | | 301/95.102 |
| 2015/0321509 A1* | 11/2015 | Kamiyama | B60B 21/025 |
| | | | 301/95.101 |
| 2016/0059624 A1* | 3/2016 | Mohan | B60B 25/22 |
| | | | 301/95.11 |

FOREIGN PATENT DOCUMENTS

| CA | 2895264 A1 * | 6/2014 | ........... B60B 21/025 |
| JP | 2006341674 A | * 12/2006 | |
| JP | 2008-279873 A | 11/2008 | |

* cited by examiner

*Primary Examiner* — Scott A Browne

(74) *Attorney, Agent, or Firm* — Rankin, Hill & Clark LLP

(57) ABSTRACT

Disclosed are a method of configuring an additional air chamber member on an outer circumferential surface of a well portion of the vehicle wheel as a Helmholtz resonator in a tire air chamber, comprising: preparing a plurality of additional air chamber members for each size of the vehicle wheel, each additional air chamber member corresponding to a different resonance frequency; and selecting one of the additional air chamber members with the corresponding resonance frequency from the additional air chamber members in accordance with a size of a tire used in combination with the vehicle wheel and an additional air chamber member information system using the method.

10 Claims, 13 Drawing Sheets

FIG. 6

| | Wheel size in inches Small ←——————→ Large | | | | |
|---|---|---|---|---|---|
| Low | A10 | ... | A15 | ... | A20 |
| Aspect ratio ↑↓ | B10 | ... | B15 | ... | B20 |
| | C10 | ... | C15 | ... | C20 |
| High | D10 | ... | D15 | ... | D20 |

METHOD OF CONFIGURING ADDITIONAL AIR CHAMBER MEMBER FOR VEHICLE WHEEL AND ADDITIONAL AIR CHAMBER MEMBER INFORMATION SYSTEM

CROSS REFERENCE TO RELATED APPLICATION

This application claims the priority of Japanese Patent Application No. 2017-133228, filed on Jul. 7, 2017 in the Japan Patent Office, the entire specification, claims and drawings of which are incorporated herewith by reference.

BACKGROUND OF THE INVENTION

1. Field of the Invention

The present invention relates to a method of configuring an additional air chamber member for a vehicle wheel and an additional air chamber member information system.

2. Description of the Related Art

Conventional additional air chamber members (resonators) have been manufactured by designing an additional air chamber member for each specific car model (see, for example, Japanese Patent Application Publication No. 2008-279873).

SUMMARY OF THE INVENTION

An aspect of the present invention provides a method of configuring an additional air chamber member on an outer circumferential surface of a well portion of the vehicle wheel as a Helmholtz resonator in a tire air chamber, comprising:
preparing a plurality of additional air chamber members for each size of the vehicle wheel, each additional air chamber member corresponding to a different resonance frequency; and
selecting one of the additional air chamber members with the corresponding resonance frequency from the additional air chamber members in accordance with a size of a tire used in combination with the vehicle wheel.

An aspect of the present invention provides an additional air chamber member information system comprising:
an additional air chamber member database that stores:
sizes of vehicle wheels usable for a vehicle;
sizes of tires usable for each of the vehicle wheels which are associated with the sizes of the vehicle wheels; and
information on additional air chamber members that can cancel road noise when applied to the vehicle wheel;
an input reception section configured to receive, via a communication network from a terminal, an input of the size of a desired vehicle wheel and the size of a desired tire; and
an information output section configured to obtain, from the additional air chamber member database, information on the additional air chamber members applied to the vehicle wheel on the basis of the size of a vehicle wheel and the size of a tire as having been received in the input reception section and to output and display the information, via the communication network, on the terminal.

BRIEF DESCRIPTION OF DRAWINGS

FIG. 6 is a table showing a relationship between wheel sizes in inches and aspect ratios when each additional air chamber member is selected.

DESCRIPTION OF EMBODIMENTS

Prior to describing embodiments of the present invention, the above-mentioned related art will be further argued.

The technology described in JP2008-279873A requires a large number of steps during development because an additional air chamber member has been designed for each specific car model. In addition, there has been no system for providing appropriate information on an additional air chamber member corresponding to a car model of interest.

The present invention has resolved the above conventional problem. The present invention provides a method of configuring an additional air chamber member for a vehicle wheel, etc. This method can reduce the number of steps during development.

Figure 1:
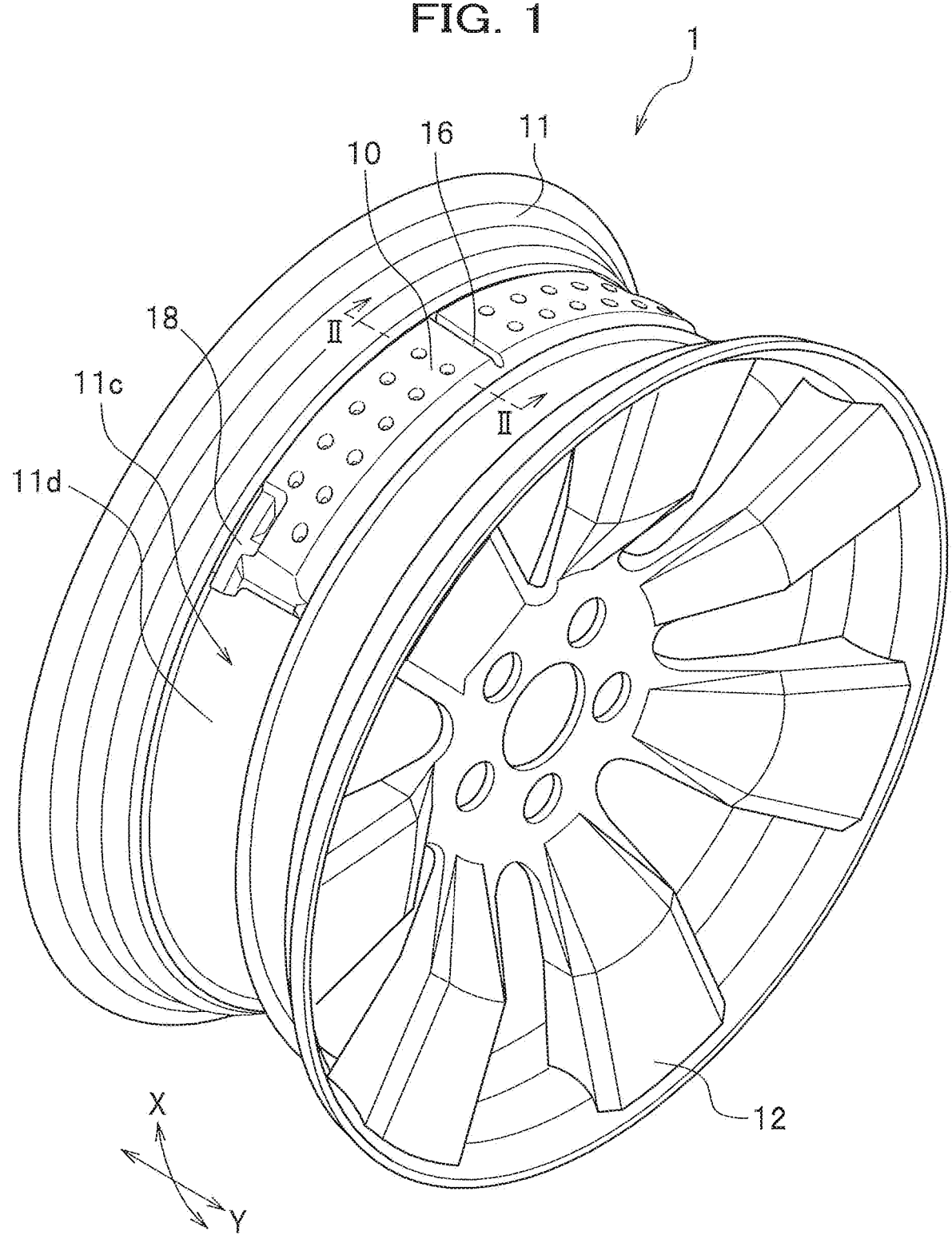
FIG. 1 is a perspective view illustrating an additional air chamber member-attached vehicle wheel according to an embodiment of the present invention.
Figure 2:
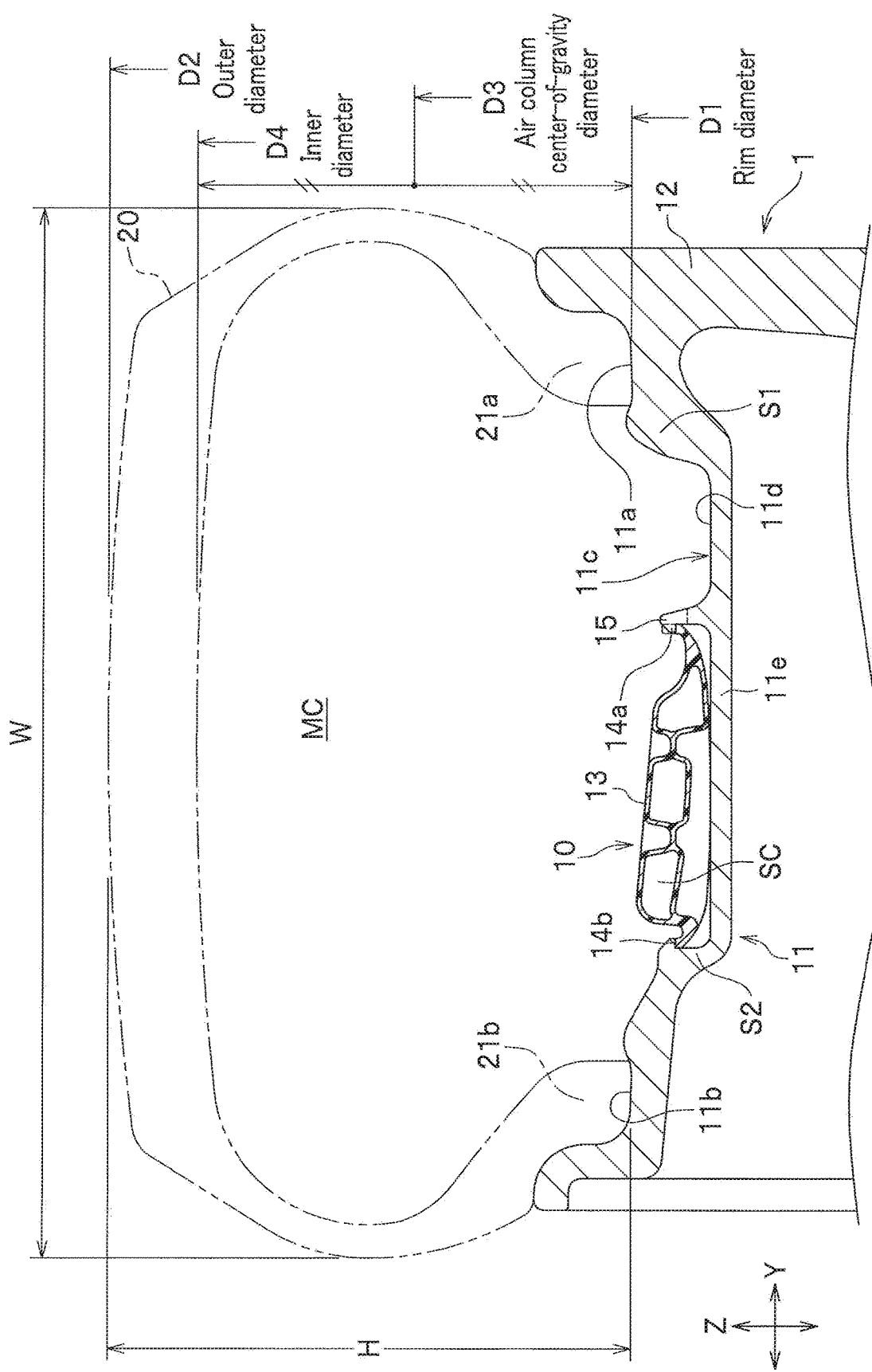
FIG. 2 is a cross-sectional view taken along line II-II of FIG. 1.
Figure 3:
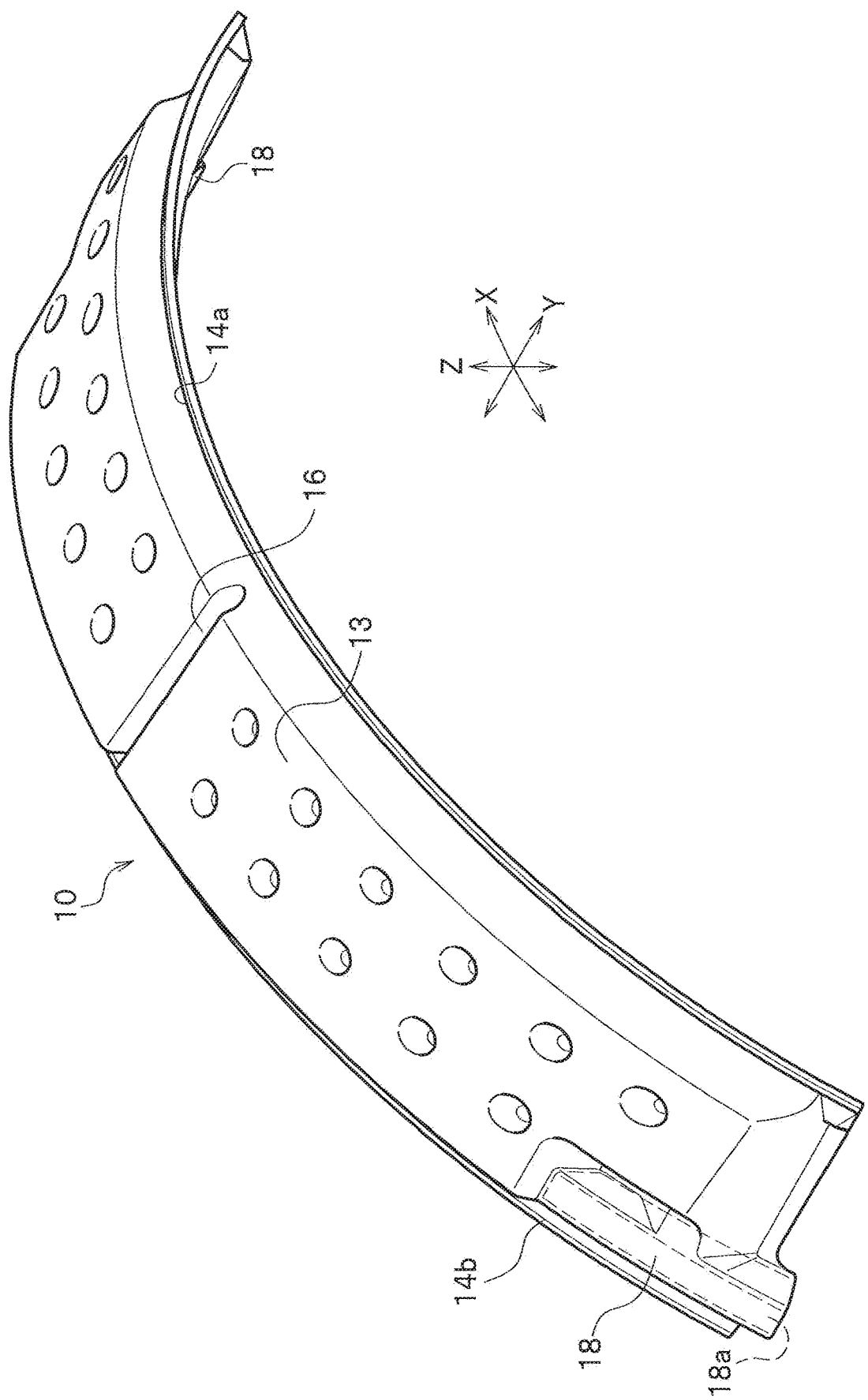
FIG. 3 is a perspective view of the whole additional air chamber member of FIG. 1.

Hereinafter, embodiments of the present invention are described in detail with reference to the Drawings. First, a vehicle wheel 1 having an additional air chamber member 10 is illustrated by referring to FIGS. 1 to 3. FIG. 1 is a perspective view illustrating an additional air chamber member-attached vehicle wheel. FIG. 2 is a cross-sectional view taken along line II-II of FIG. 1. FIG. 3 is a perspective view of the whole additional air chamber member of FIG. 1.

As shown in FIG. 1, the vehicle wheel 1 has the additional air chamber member 10, as a Helmholtz resonator, extending in the circumferential direction X of the wheel.

In addition, the vehicle wheel 1 is provided with: a rim 11; and disks 12 used to connect this rim 11 to a hub (not shown). The additional air chamber member 10 is fit and installed onto, for example, an outer circumferential surface 11d of a well portion 11c of the rim 11. The following describes the rim 11, followed by the additional air chamber member 10.

FIG. 2 depicts a tire 20, which is attached to the rim 11, by using an imaginary line (alternate long and two short dashes line). In this regard, bead portions 21a and 21b of the tire 20 generate contracting forces, which attach the tire 20 to the rim 11.

The rim 11 has the well portion 11c, which is disposed between bead seats 11a and 11b arranged under the bead portions 21a and 21b and is recessed toward the inside (the bottom side of FIG. 2 paper sheet) in the radial direction Z of the wheel.

The well portion 11c has a trunk portion 11e and a pair of step portions S1 and S2, which face each other in the width direction Y of the wheel while this trunk portion 11e is sandwiched therebetween. The trunk portion 11e is a cylinder with substantially the same radius along the width direction Y of the wheel. The step portions S1 and S2 are formed such that each step portion stands toward the outer side (upper side of FIG. 2 paper sheet) in the radial direction Z of the wheel relative to the surface of the trunk portion 11e, namely the outer circumferential surface 11d of the well portion 11c.

In addition, the outer circumferential surface of the well portion 11c has a vertical wall 15 formed near the middle point in the width direction Y of the wheel. This vertical wall 15 has an annular shape along the circumferential direction X (see FIG. 1) of the wheel.

Note that, in FIG. 2, the reference sign MC denotes a tire air chamber. In addition, the reference numeral 13 denotes a main body of the additional air chamber member 10 described below.

As shown in FIG. 3, the additional air chamber member 10 is a member elongated in the circumferential direction X of the wheel, and includes a main body 13, a tube member 18, and edge portions 14a and 14b. Here, in the additional air chamber member 10, the edge portion 14b is locked to the step portion S2 and the edge portion 14a is locked to the vertical wall 15.

The main body 13 is curved in accordance with the curvature of the outer circumferential surface 11d (see FIG. 1) in the circumferential direction and is elongated in the circumferential direction accordingly.

The tube member 18 is a terminal portion in the longitudinal direction of the additional air chamber member 10 (in the circumferential direction X of the wheel) and is arranged biased to one side edge in the short direction of the additional air chamber member 10 (in the width direction Y of the wheel). Specifically, the tube member 18 is arranged near to the edge portion 14b of the two edge portions 14a and 14b.

The inside of such a tube member 18 has a communication hole 18a as shown in FIG. 3. The cross-section shape of the communication hole 18a is approximately rectangular. Meanwhile, the communication hole 18a makes it possible to let the tire air chamber MC (see FIG. 2) communicate with an additional air chamber SC (see FIG. 2) formed inside the additional air chamber member 10.

In addition, the main body 13 has a partition wall 16 that is disposed at the middle portion in the circumferential direction X of the wheel and divides the additional air chamber SC, which is an inside hollow part, into two rooms. Each tube member 18 is formed at an opposite terminal portion of the main body 13 in the circumferential direction X of the wheel. The interval between the communication holes 18a of the additional air chamber member 10 is set to about 90 degrees. Note that in this embodiment, the case has been described where one piece of the additional air chamber member 10 having the communication holes 18a at the interval of 90 degrees is installed on the well portion 11c. However, the one and another piece of the additional air chamber member 10 may be installed to the symmetrical positions interposing the rotation center of the vehicle wheel 1.

Note that the additional air chamber member 10 may be, but is not limited to, a resin molding product, but may be produced using another material such as metal. Note that in the case of the resin product, it is desirable to use a light-weight, rigid resin allowing for blow molding from the viewpoints of reducing the weight, increasing the mass productivity, cutting the manufacturing cost, retaining air tightness of the additional air chamber SC, etc. Among them, particularly preferred is polypropylene, which can endure repeated bending stress.

First Embodiment

Figure 4A:
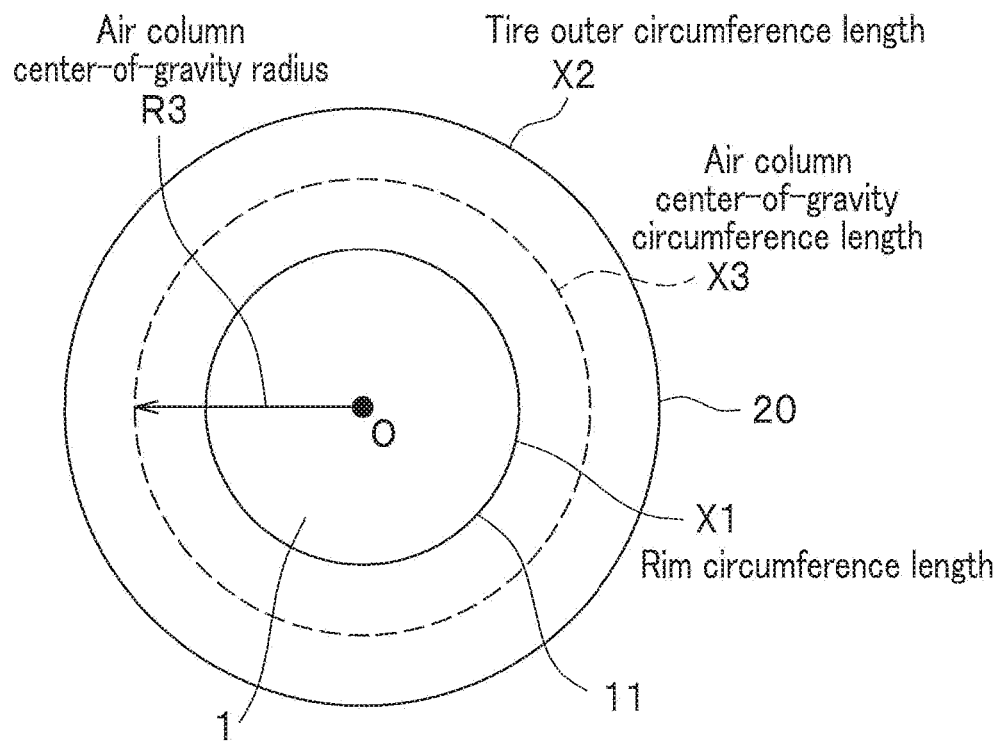
FIG. 4A schematically explains the air column center-of-gravity circumference.
Figure 4B:
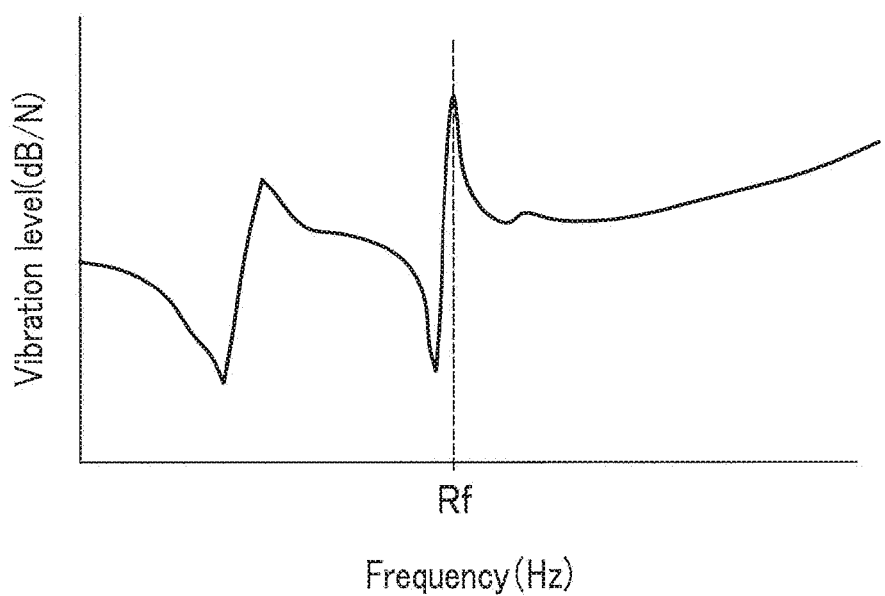
FIG. 4B is a graph showing a relationship between the resonance frequency and the wheel vibration level of a tire vibration test.
Figure 5:
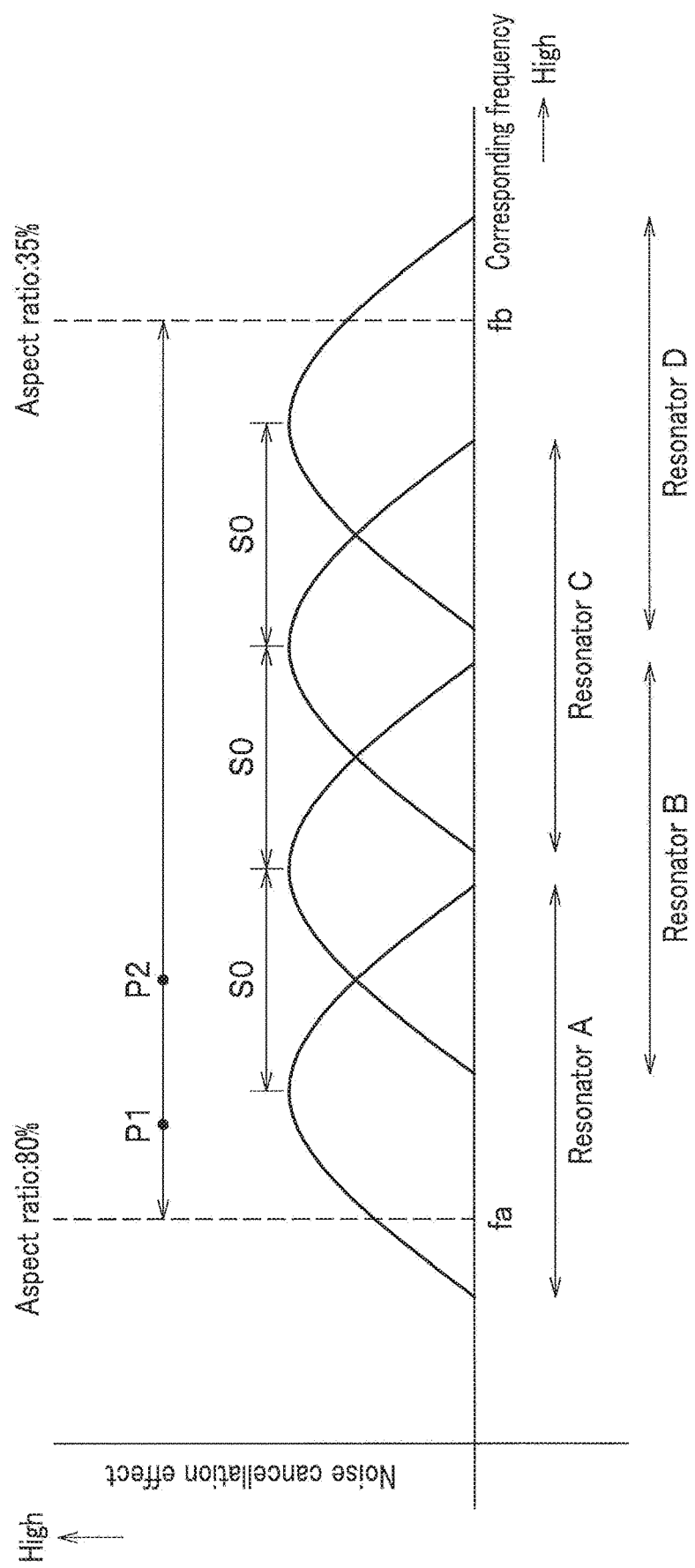
FIG. 5 depicts the distribution of the frequency of each additional air chamber member according to the first embodiment.

Meanwhile, if an additional air chamber member 10 is designed for each specific car model, a large number of steps during development is unfortunately required. Here, in this embodiment, one effective additional air chamber member is selected from a plurality of additional air chamber members 10 prepared beforehand and is then used for the vehicle wheel 1. In this way, the number of steps during development is thus reduced. The following details how to configure an additional air chamber member 10 for a vehicle wheel 1 according to the first embodiment with reference to FIGS. 4A to 6. FIG. 4A schematically explains the air column center-of-gravity circumference. FIG. 4B is a graph showing a relationship between the resonance frequency and the wheel vibration level of a tire vibration test. FIG. 5 depicts the distribution of the frequency of each additional air chamber member according to the first embodiment. FIG. 6 is a table showing a relationship between wheel sizes in inches and aspect ratios when each additional air chamber member is selected.

As shown in FIG. 4A, the rim circumference X1 of the rim 11 of the vehicle wheel 1 is the circumferential length when the rim size (diameter) is D1 (see FIG. 2). The tire outer circumference X2 is the circumferential length when the outer size (diameter) of the wheel (the vehicle wheel 1+a tire 20) is D2 (see FIG. 2).

In addition, as shown in the dashed line of FIG. 4, the air column center-of-gravity circumference X3 is the circumferential length when the point at the air column center-of-gravity radius (radius) R3 rotates, around the rotation center O of the tire 20. Note that as shown in FIG. 2, the air column center-of-gravity radius R3 refers to an approximate middle position in the radial direction between the inner size D4 of the tire 20 and the rim size D1 of the rim 11. Note that the rim size D1 involves a portion with which the bead portion 21a or 21b of the tire 20 comes into contact.

Meanwhile, the frequency can be expressed using the following Eq. (1). Note that the speed of sound in air is about 350 m/s (at 25° C.).

$$\text{Frequency} = \text{Speed of sound} / \text{Wavelength} \qquad \text{Eq. (1)}.$$

In addition, the air column resonance wavelength can be expressed using the following Eq. (2).

$$\text{Air column resonance wavelength} = \text{Air column center-of-gravity circumference} \qquad \text{Eq. (2)}.$$

From Eqs. (1) and (2), the air column resonance frequency (resonance frequency) can be expressed using the following Eq. (3).

$$\text{Air column resonance frequency} = \text{Speed of sound} / \text{Air column center-of-gravity circumference} \quad \text{Eq. (3)}.$$

In this way, Eq. (3) is used to determine the air column resonance frequency based on the air column center-of-gravity circumference X3. This air column center-of-gravity circumference X3 is determined using the air column center-of-gravity radius R3 (see FIG. 2). That is, the air column center-of-gravity circumference X3 is determined based on the aspect ratio of a tire, namely an index of the size of the tire 20. Note that the aspect ratio of a tire can be calculated as (H/W)×100(%) when the height of the tire is H (see FIG. 2) and the cross-section width of the tire is W (see FIG. 2).

In a tire vibration test shown in (FIG. 4B), air column resonance in a tire air chamber MC (see FIG. 2) occurs, for instance, when the frequency is at Rf (e.g., 220 Hz).

As shown in FIG. 5, in the case of the wheel at 17 inches (the size in inches), for instance, a possible aspect ratio is usually from 80% to 35% (1 inch is about 2.54 cm). When the aspect ratio of a tire is 80%, the air column center-of-gravity radius R3 (see FIG. 4A) is large, so that the air column center-of-gravity circumference X3 (see FIG. 4A) is also long. Thus, in the Eq. (3), as the air column center-of-gravity circumference X3 (denominator) becomes larger, the air column resonance frequency decreases. In addition, when the aspect ratio of a tire is 35%, the air column center-of-gravity radius R3 is small, so that the air column center-of-gravity circumference is also short. Thus, in the Eq. (3), as the air column center-of-gravity circumference X3 (denominator) becomes smaller, the air column resonance frequency increases.

In this way, when the air column center-of-gravity circumference X3 is determined, the air column resonance frequency is determined. Accordingly, the range of the frequency estimated for the vehicle wheel 1 at 17 inches is set (at from frequency fa to fb). A frequency corresponding to one additional air chamber member (hereinafter, referred to as a resonator) may be assumed to be the frequency ±5 Hz. In this case, prepared is a set of four different resonators (resonators A, B, C, and D). Consequently, the overall corresponding frequency range (from fa to fb) can be covered (i.e., road noise can be canceled). Regarding the resonators A to D, the noise cancellation effects are highest at the center of the corresponding frequency range of each. As the frequency is apart from the center, the noise cancellation effects decrease to give a mound-shaped distribution of the frequency. Meanwhile, the interval of the corresponding frequency between resonator A and resonator B is S0; the interval of the corresponding frequency between resonator B and resonator C is S0; and the interval of the corresponding frequency between resonator C and resonator D is S0. Thus, each interval is identical. In other words, resonators A to D have corresponding frequencies arranged with the identical interval S0.

In addition, resonators adjacent to each other in terms of the corresponding frequency (i.e., resonators A and B, resonators B and C, and resonators C and D) have a partially overlapped corresponding frequency range excluding at least peak frequencies of the noise cancellation effects. By doing so, noise can be effectively canceled over the entire range from frequency fa to fb.

Here, if resonators A to D are set for a wheel at 17 inches and the aspect ratio of a tire selected is the point P1 of FIG. 5, the resonator A is selected and installed on the vehicle wheel 1 so as to be able to reduce air column resonance sound. Alternatively, if the aspect ratio of a tire is the point P2 of FIG. 5, the resonator A or resonator B, whichever is effective, is selected and installed so as to be able to reduce air column resonance sound.

In this way, in the first embodiment, a plurality of resonators A to D may be prepared (manufactured) beforehand for a wheel at one specific size. Then, one of the resonators A to D can be selected in accordance with the aspect ratio of the tire. Likewise, a plurality of resonators may be prepared (manufactured) beforehand for a wheel at another size and the best resonator can be selected based on the wheel and tire selected.

As shown in FIG. 6, in the first embodiment, a plurality of resonators are prepared for each size in inches for every wheel (for each size of the subject wheel). For instance, when the size in inches of the wheel is small (e.g., 13 inches), resonators A10, B10, C10, and D10 may be prepared in accordance with the aspect ratio. In addition, when the size in inches of the wheel is large (e.g., 22 inches), resonators A20, B20, C20, and D20 may be prepared in accordance with the aspect ratio. Further, when the size in inches of the wheel is intermediate (e.g., 17 inches), resonators A15, B15, C15, and D15 may be prepared in accordance with the aspect ratio. Furthermore, when the size in inches of the wheel is other ones (e.g., 14 to 16 inches, 18 to 21 inches) (not shown), a plurality of resonators may also be prepared in accordance with the aspect ratio. In this connection, as the size in inches of the wheel becomes smaller, the resonance frequency increases; and as the size in inches of the wheel becomes larger, the resonance frequency decreases.

In this way, in the first embodiment, a plurality of resonators A to D corresponding to each size in inches of the wheel are prepared beforehand. For instance, one may ask a customer which size in inches of a wheel and which aspect ratio of a tire are needed; and a resonator fit for them can be selected from the table shown in FIG. 6. This allows catalog sales. For example, when the size in inches of the wheel is 17 inches and the tire with a high aspect ratio is attached to the wheel, the resonator D15 (see FIG. 6) may be selected.

Note that examples of how to attach the selected resonator D15 to the vehicle wheel 1 include, but are not limited to, the above-described procedure. For instance, when the vehicle wheel 1 does not have any vertical wall 15 on the well portion 11c, the resonator may be broadly formed so as to lock the edge portions of the resonator at the step portions S1 and S2.

In addition, another procedure may use a configuration where a resonator (additional air chamber member 10) is bonded to the rim 11 if the resonator is made of synthetic resin; or a resonator (additional air chamber member 10) is welded to the rim 11 if the resonator is made of metal.

As described above, in the method of configuring a resonator for the vehicle wheel 1 according to the first embodiment, a plurality of resonators A to D are prepared for each size (size in inches) of the vehicle wheel 1 and the respective resonators A to D have different corresponding resonance frequencies. Further, in the first embodiment, a resonator with an appropriate corresponding frequency is selected, in accordance with the size of the tire 20 used in combination with the vehicle wheel 1, from the resonators A to D (A10, B10, C10, D10, ..., A15, B15, C15, D15, ..., A20, B20, C20, D20). As shown in FIG. 6, a plurality of resonators (A10, B10, C10, D10, ..., A15, B15, C15, D15, ..., A20, B20, C20, D20) should be prepared beforehand as catalog products. This way enables the number of steps during development to be reduced because it is unnecessary to design additional air chamber members (resonators) for each specific car model. Besides, the resonators are applicable to not only the specific car model but also a variety of car models.

By the way, with respect to the air column resonance frequency, the air column center-of-gravity circumference X3 of the tire 20 (see FIG. 4A) is a critical factor. The aspect ratio of the tire 20 largely affects the air column center-of-gravity circumference X3 of the tire 20. Here, in the first embodiment, the resonator used is selected in accordance with the aspect ratio of the tire 20 (tire size) used in combination with the vehicle wheel 1. This makes it possible to efficiently select a resonator of interest, in other words, to reliably select a resonator so as to be able to exert the noise cancellation effects.

Meanwhile, in the first embodiment, the corresponding resonance frequencies of the resonators A to D are arranged with the identical interval S0 (see FIG. 5). The interval is set to the same, so that the effective noise cancellation with respect to a broad range of the tire size can be realized. In other words, the noise cancellation effects on from a tire with a high aspect ratio to a tire with a low aspect ratio can be stably exerted (see FIG. 5).

Second Embodiment

Figure 7:
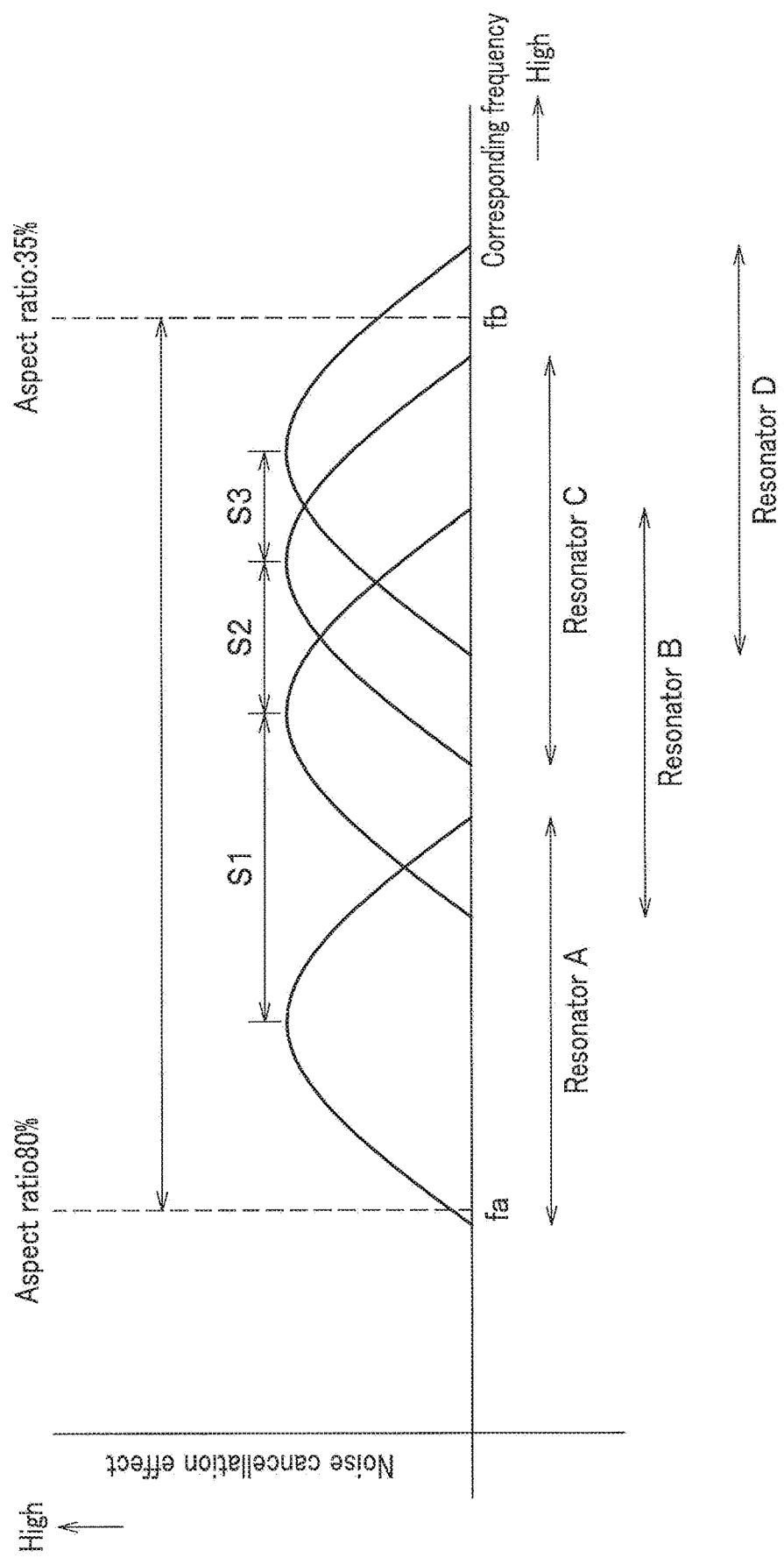
FIG. 7 depicts the distribution of the frequency of each additional air chamber member according to the second embodiment.

FIG. 7 depicts the distribution of the frequency of each additional air chamber member according to the second embodiment.

As shown in FIG. 7, the method of configuring a resonator for the vehicle wheel 1 according to the second embodiment includes providing resonators A to D having corresponding resonance frequencies with unequal intervals. Specifically, the interval S1 of the corresponding frequency (corresponding resonance frequency) between the resonator A and the resonator B is longest; the interval S2 of the corresponding frequency between the resonator B and the resonator C is shorter than the interval S1; and the interval S3 of the corresponding frequency between the resonator C and the resonator D is shorter than the interval S2 (S1>S2>S3). In addition, resonators adjacent to each other in terms of the corresponding frequency (i.e., resonators A and B, resonators B and C, and resonators C and D) have a partially overlapped corresponding frequency range excluding at least peak frequencies of the noise cancellation effects. The overlap between the resonator C and the resonator D is biggest; the overlap between the resonator A and the resonator B is smallest; and the overlap between the resonator B and the resonator C is intermediate.

Generally speaking, the best-selling tire size (aspect ratio) depends on the size in inches of a wheel and is thus different. Accordingly, in the second embodiment, the resonance frequencies corresponding to the resonators A to D are arranged with the unequal intervals (see FIG. 7). Here, the corresponding frequencies are set in accordance with the best-selling tire. In this way, it is possible to provide the optimal noise cancellation effects matched to the needs.

Note that in the second embodiment, the intervals of the corresponding frequency between the resonators are set such that the respective intervals S1, S2, and S3 are all different. However, the present invention is not limited to such a configuration. For instance, the interval of the corresponding frequency between the resonator A and the resonator B may be S1; and the interval of the corresponding frequency between the resonator B and the resonator C and the interval of the corresponding frequency between the resonator C and the resonator D may be the same and shorter than the interval S1.

Third Embodiment

Figure 8:
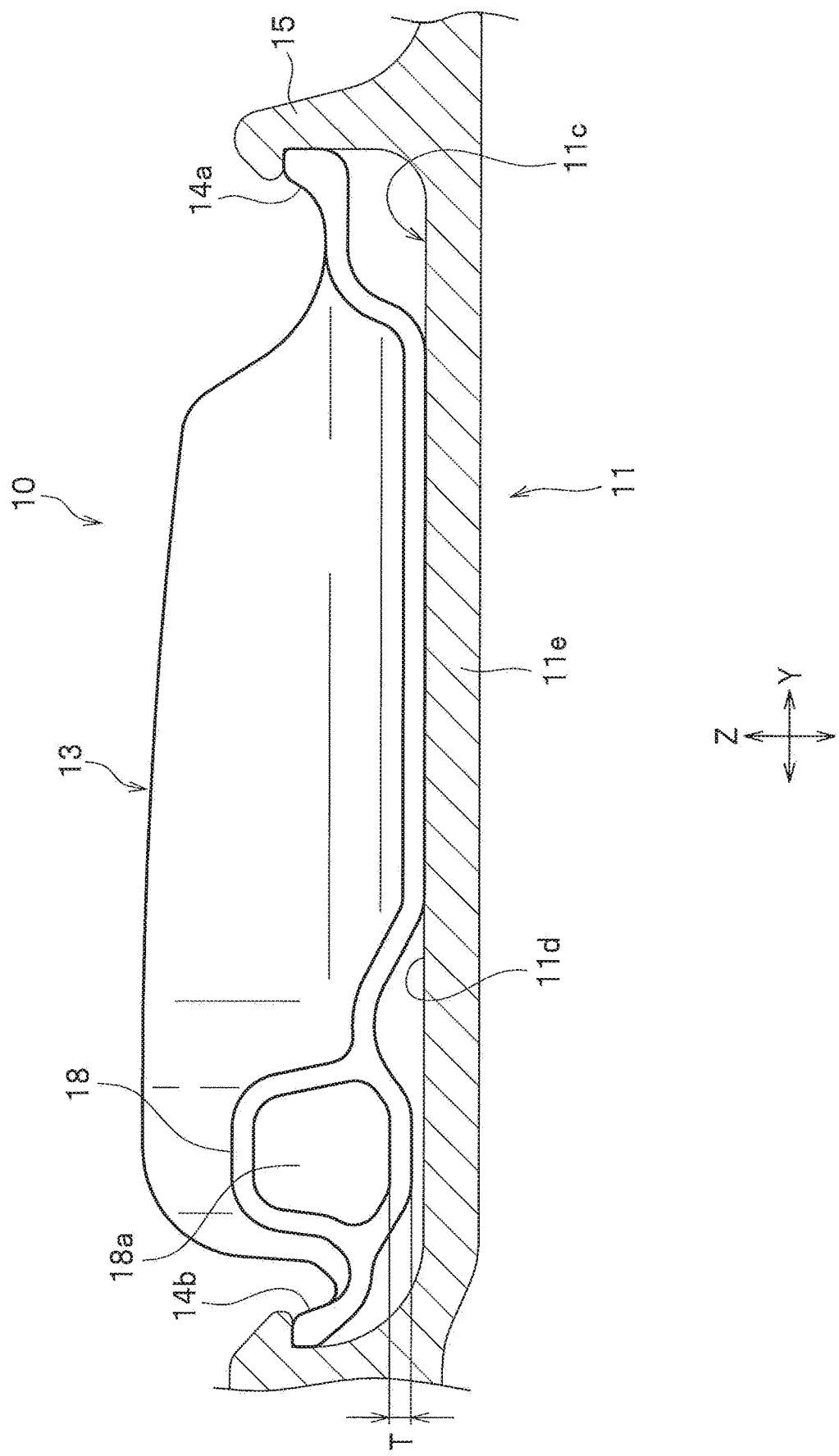
FIG. 8 is a cross-sectional view of an additional air chamber member cut at the position of a communication hole.
Figure 9:
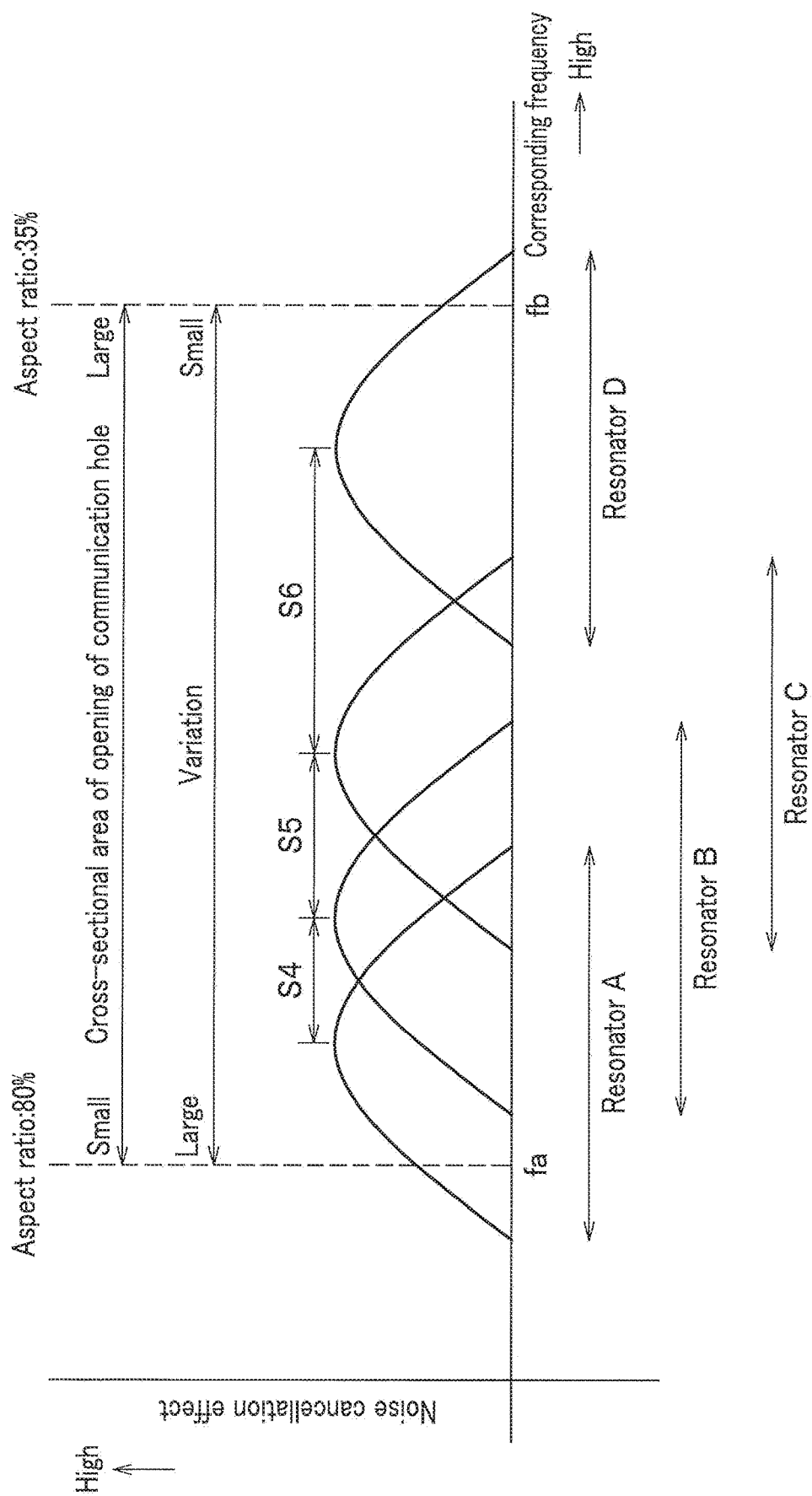
FIG. 9 depicts the distribution of the frequency of each additional air chamber member according to the third embodiment.

FIG. 8 is a cross-sectional view of an additional air chamber member cut at the position of a communication hole. FIG. 9 depicts the distribution of the frequency of each additional air chamber member according to the third embodiment.

Meanwhile, each resonator has a variation factor. As shown in FIG. 8, variation in the thickness T of the resin of the resonator (additional air chamber member 10) sometimes causes a problem. The thickness T of the resin affects the cross-sectional area S of the opening of the communication hole 18a. That is, as the thickness T of the resin becomes thinner, the cross-sectional area S of the opening of the communication hole 18a increases; and as the thickness T of the resin becomes thicker, the cross-sectional area S of the opening of the communication hole 18a decreases.

In addition, the length L of the communication hole 18a is set so as to satisfy the following Eq. (4) where the resonance frequency f0 of a Helmholtz resonator is calculated.

$$f0 = C/2\pi \times \sqrt{(S/V(L+\alpha \times \sqrt{S})} \qquad \text{Eq. (4).}$$

where f0 (Hz): resonance frequency;
C (m/s): the speed of sound in an additional air chamber SC (=the speed of sound in a tire air chamber MC);
V (m$^3$): volume of the additional air chamber SC;
L (m): length of a communication hole 18a;
S (m$^2$): cross-sectional area of an opening of the communication hole 18a; and
α: correction coefficient.

Note that the resonance frequency f0 should be fit for the resonance frequency of the tire air chamber MC.

According to the above Eq. (4), when the cross-sectional area S of the opening is large, a change in the cross-sectional area due to the variation in the thickness T (see FIG. 8) is small. In contrast, when the cross-sectional area S of the opening is small, a change in the cross-sectional area due to the variation in the thickness T (see FIG. 8) is large. Here, the method of configuring a resonator for the vehicle wheel 1 according to the third embodiment includes the configuration where, as shown in FIG. 9, the interval of the corresponding frequency between the resonators on the low frequency side with a large variation is narrower than the interval on the high frequency side. Specifically, the interval S4 of the corresponding frequency between the resonator A and the resonator B is shortest; the interval S5 of the corresponding frequency between the resonator B and the resonator C is longer than the interval S4; and the interval S6 of the corresponding frequency between the resonator C and the resonator D is longer than the interval S5 (S4<S5<S6).

Accordingly, in the third embodiment regarding the intervals of the corresponding frequency among the resonators A to D, the interval S4 on the low frequency side is narrower than the interval S6 on the high frequency side. In this way, the corresponding frequencies are set in accordance with the resonator product variation, so that insufficient noise cancellation for each tire size can be suppressed.

Fourth Embodiment

Figure 10:
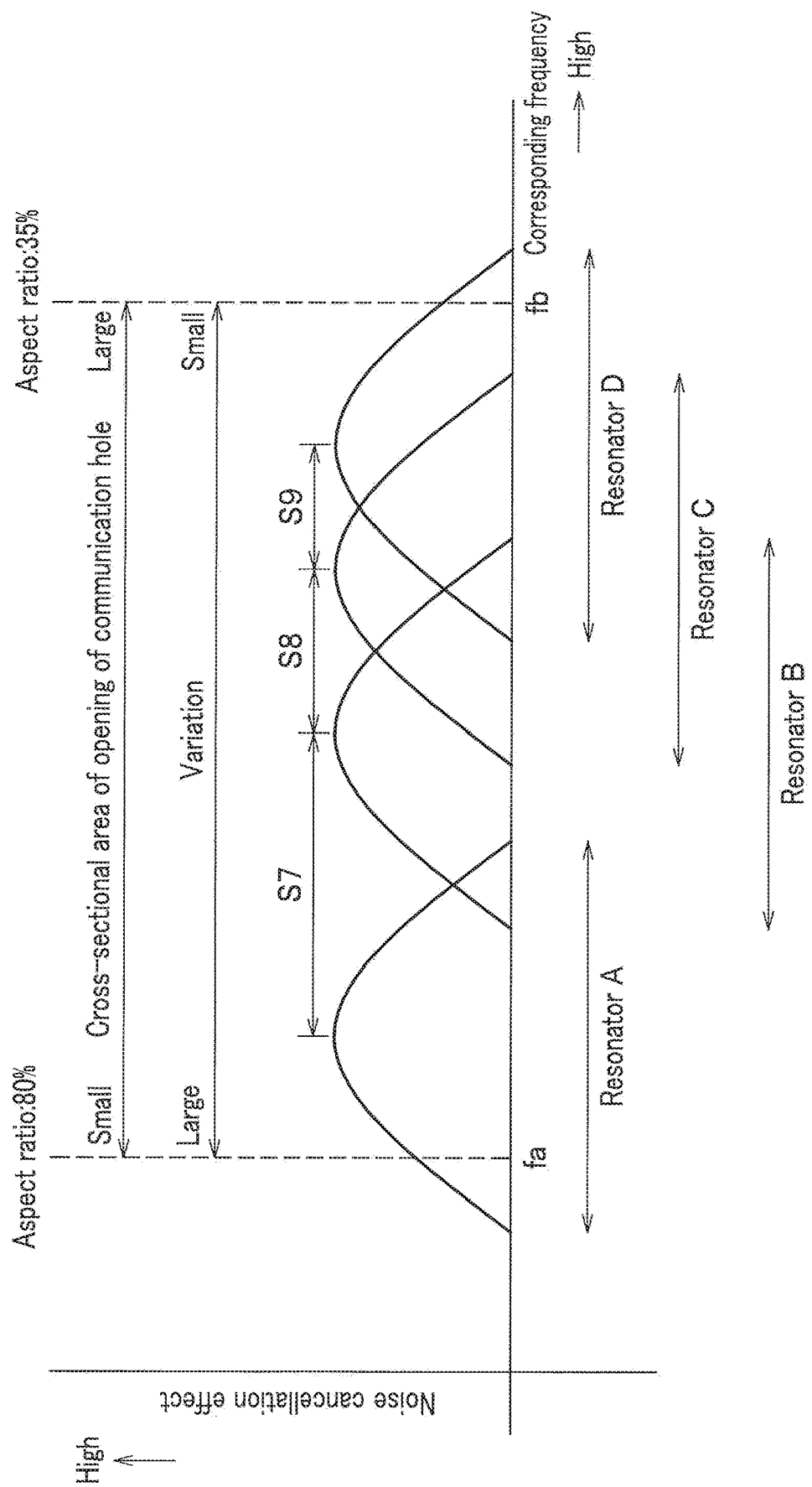
FIG. 10 depicts the distribution of the frequency of each additional air chamber member according to the fourth embodiment.

FIG. 10 depicts the distribution of the frequency of each additional air chamber member according to the fourth embodiment.

As shown in FIG. 10, the fourth embodiment is in contrast with the third embodiment. The interval S9 of the corresponding frequency on the low variation side (on the high frequency side) is intentionally set to be narrower than the interval S7 on the large variation side (on the low frequency side). Specifically, the interval S7 of the corresponding frequency between the resonator A and the resonator B is longest; the interval S8 of the corresponding frequency between the resonator B and the resonator C is shorter than the interval S7; and the interval S9 of the corresponding frequency between the resonator C and the resonator D is shorter than the interval S8 (S9<S8<S7).

Accordingly, in the fourth embodiment regarding the intervals of the corresponding frequency among the resonators A to D, the interval S9 on the high frequency side is narrower than the interval S7 on the low frequency side. This makes it possible to achieve a higher noise cancellation effect on the low variation side (on the high frequency side).

Figure 11:
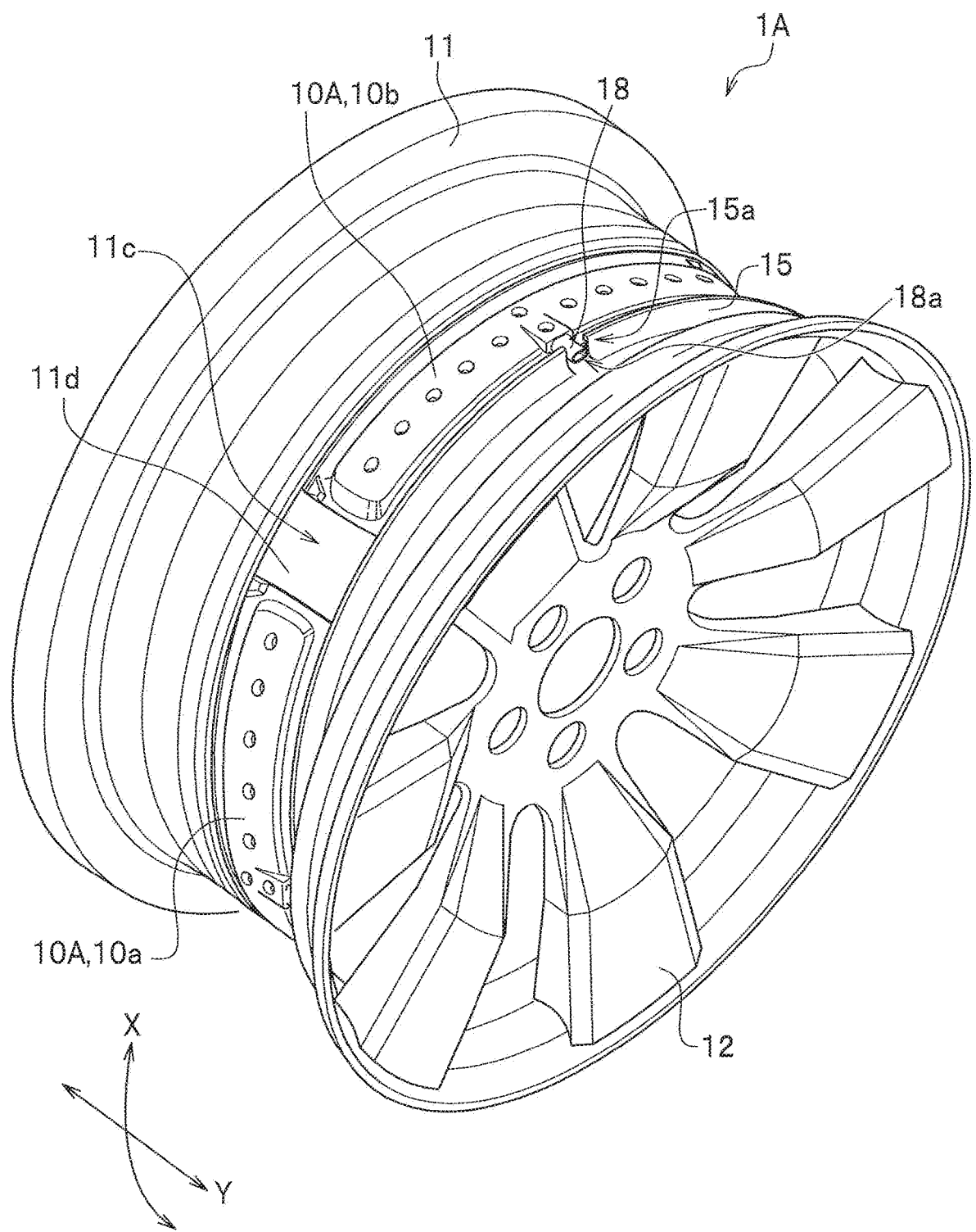
FIG. 11 is a perspective view illustrating a vehicle wheel having another additional air chamber member attached.

Note that the first to fourth embodiments are applicable to the additional air chamber member 10 shown in FIG. 1 and these cases have been described as examples. However, the present invention is not limited to such an additional air chamber member, and an additional air chamber member 10A shown in FIG. 11 is also applicable. FIG. 11 is a perspective view illustrating a vehicle wheel having another additional air chamber member attached.

As shown in FIG. 11, a vehicle wheel 1A has a plurality of additional air chamber members 10A, as Helmholtz resonators, in the circumferential direction X of the wheel. For drawing convenience, FIG. 11 depicts only 2 additional air chamber members 10a and 10b. However, the vehicle wheel 1A includes 4 additional air chamber members 10a, 10b, etc., in the circumferential direction X of the wheel. The additional air chamber members 10a, 10b, etc., each have one additional air chamber. In addition, the additional air chamber members 10a and 10b each have a tube member 18 that is positioned at the middle in the circumferential direction X of the wheel and protrudes in the width direction Y (on the vertical wall 15 side) of the wheel. The four tube members 18 are arranged every 90 degrees in the circumferential direction X of the wheel.

Generally speaking, a Helmholtz resonator is set in accordance with a tire air column resonance frequency. It is also possible to provide two sets of a communication hole 18a of a first Helmholtz resonator, which has a resonance frequency lower than the tire air column resonance frequency, and a communication hole 18a of a second Helmholtz resonator, which has a resonance frequency higher than the tire air column resonance frequency. In this case, a line connecting, via the rotation center of the wheel, the communication hole 18a of the first Helmholtz resonator and the communication hole of the second Helmholtz resonator of one of the sets is perpendicular to a line connecting, via the rotation center of the wheel, the communication hole 18a of the first Helmholtz resonator and the communication hole of the second Helmholtz resonator of the other set.

One of the edge portions of the additional air chamber member 10A in the width direction Y of the wheel is locked to the vertical wall 15. In addition, the vertical wall 15 has a notch 15a for which the tube member 18 is fit when the additional air chamber member 10A is locked.

Note that the vehicle wheel 1A is provided with the additional air chamber members 10A at 4 sites along the circumferential direction X of the wheel and this case has been described as an example. However, the configuration may include the additional air chamber members 10A at 2 sites while the communication holes 18a are arranged at an interval of about 90 degrees.

Additional Air Chamber Member Information System

Figure 12:
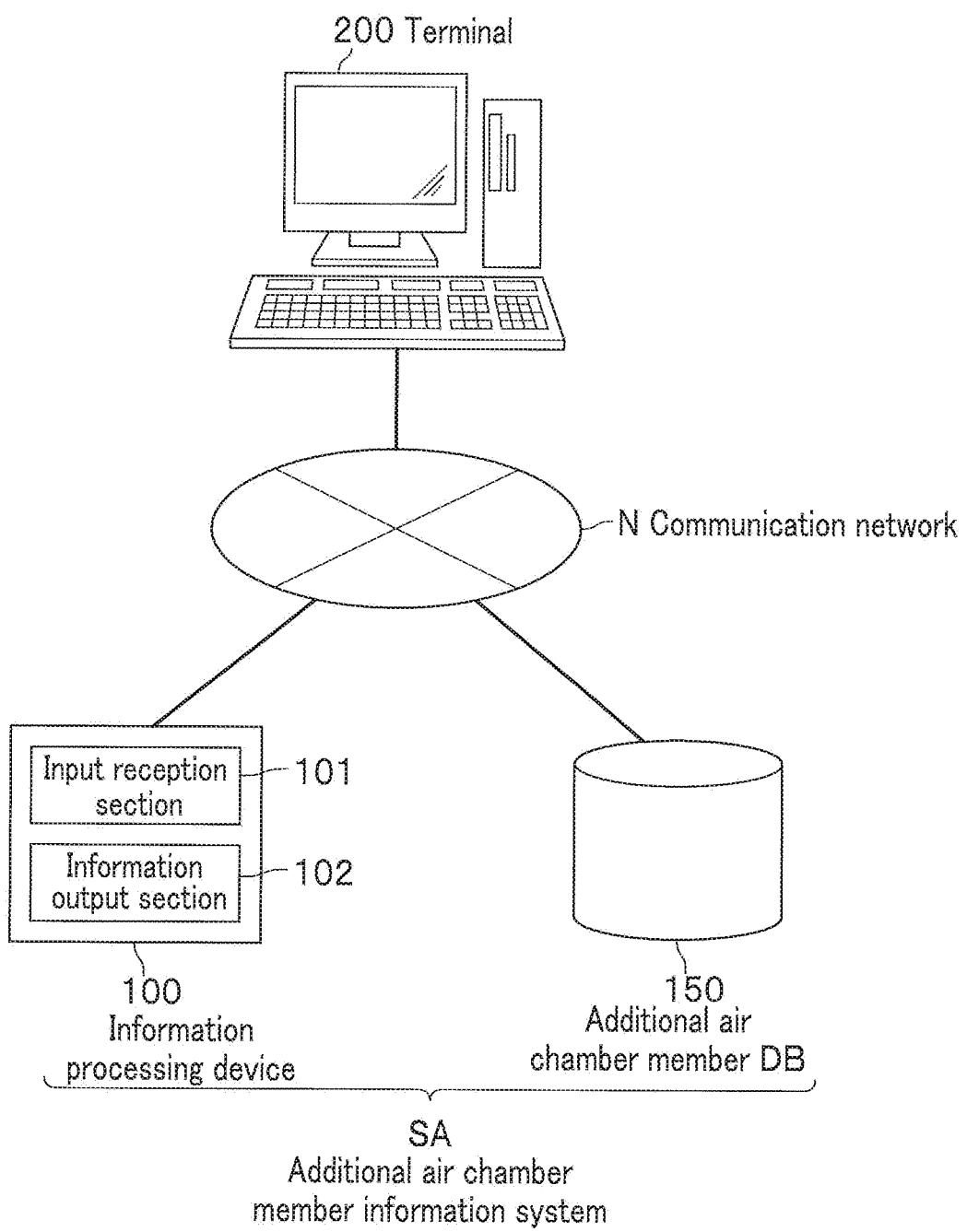
FIG. 12 is a diagram showing how to configure an additional air chamber member information system according to an embodiment of the present invention.

FIG. 12 is a diagram showing how to configure an additional air chamber member information system according to an embodiment of the present invention.

As shown in FIG. 12, the additional air chamber member information system SA (tire and wheel internet/mail order site) according to this embodiment includes an information processing device 100 and an additional air chamber member database (hereinafter, referred to as an additional air chamber member DB) 150. The additional air chamber member information system SA is applicable to sites on which tires and wheels may be ordered by internet/mail. Such an internet/mail order site is targeted. Then, once the size of a tire of interest and the size of a wheel of interest are determined, the system can determine a suitable additional air chamber member 10. A plurality of additional air chamber members (resonators) are prepared using the present method of configuring an additional air chamber member 10 for the vehicle wheel 1 and are provided for each size (size in inches) of the vehicle wheel 1 in such a tire and wheel internet/mail order site.

The additional air chamber member DB 150 stores information on additional air chamber members 10 (resonators) that can cancel road noise when applied to the vehicle wheel 1 while the resonators are provided corresponding to the size in inches of the vehicle wheel 1 (see FIGS. 1 and 2) and the size of the tire 20 used in combination with the vehicle wheel 1 (see FIG. 2). The additional air chamber member DB 150, for instance, stores data such that the sizes in inches of the vehicle wheel 1 have been assigned to the aspect ratios (sizes) of the tire 20 as shown in FIG. 6. Note that 1 inch is about 2.54 cm.

The information processing device 100 includes a processor, a storage unit, a memory, and an input and output interface (all not shown), wherein communication is conducted via a communication network N. In addition, the information processing device 100 is provided with an input reception section 101 and an information output section 102.

The input reception section 101 receives, from a terminal 200 via the communication network N, input information on the size in inches (size) of the vehicle wheel 1 and the aspect ratio (size) of the tire 20 used in combination with the vehicle wheel 1. Note that examples of the terminal 200 include various input/output devices such as personal computers, cellular phones, and mobile portable information terminals.

The information output section 102 can obtain, from the additional air chamber member DB 150, information on additional air chamber members 10 (resonators) applied for the vehicle wheel 1 on the basis of the size in inches of the vehicle wheel 1 and the aspect ratio (size) of the tire 20 as having been received in the input reception section 101, and can output and display the information, via the communication network N, on the terminal 200.

Note that FIG. 10 shows that the information processing device 100 and the additional air chamber member DB 150 are separately provided, but they may be integrated.

In the additional air chamber member information system SA as so constructed, a resonator fit for the wheel (tire+wheel) a user wants can be easily selected while the user inputs the size (aspect ratio) of the tire 20 and the size (size in inches) of the vehicle wheel 1.

Figure 13:
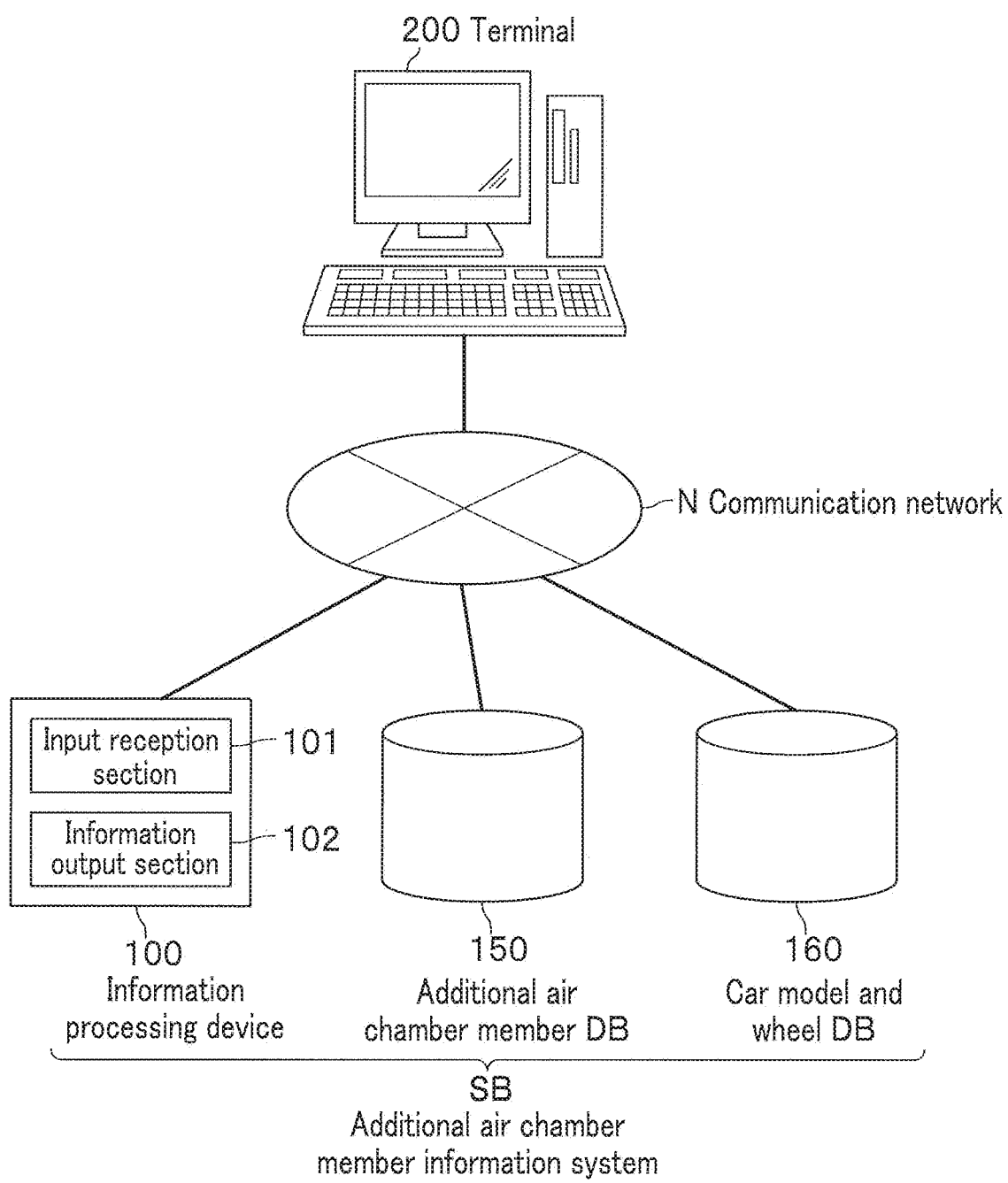
FIG. 13 is a diagram showing how to configure another additional air chamber member information system according to an embodiment of the present invention.

FIG. 13 is a diagram showing how to configure another additional air chamber member information system according to an embodiment of the present invention. Note that the same elements as of the embodiment in FIG. 12 have the same reference numerals so as to avoid redundancy.

As shown in FIG. 13, an additional air chamber member information system SB (a tire and wheel internet/mail order site) is a system including a car model and wheel database 160 (hereinafter, referred to as a car model and wheel DB) in addition to the additional air chamber member information system SA of FIG. 12.

The car model and wheel DB 160 stores information such that the sizes in inches (size) of the vehicle wheel 1 have been associated with car models. This is because if the car model is selected, the size of the wheel is determined. Note that the car models refer to, for example, individual car names.

Once receiving an input of a car model from the terminal 200, the information processing device 100 (a wheel size calculation section) calculates, based on the input car model, the size in inches (size) of the vehicle wheel 1 from the car model and wheel DB 160. That is, once receiving, via the communication network N from the terminal 200, an input of a car model, the input reception section 101 of the information processing device 100 acquires, from the car model and wheel DB 160, the size of the vehicle wheel 1 corresponding to the input car model.

Then, the information processing device 100 outputs (displays), on the terminal 200, the acquired size of the vehicle wheel 1. After the size (aspect ratio) of the tire 20 is input from the terminal 200, the acquired size of the vehicle wheel 1 and the input size of the tire 20 are used to obtain information on additional air chamber members 10 (resonators) applicable (that can cancel road noise) from the additional air chamber member DB 150 and then to output (display) the information, via the communication network N, on the terminal 200.

The additional air chamber member information system SB as so constructed can calculate the size of the vehicle wheel 1 by using only the car model input. Thus, this makes it easy to calculate the size of the vehicle wheel 1, thereby making it easy to select an additional air chamber member 10 (resonator) of interest.

Note that the above-described embodiment describes, as an example, the case of calculating the size of the vehicle wheel 1 by using only the car model input. However, the present invention is not limited to such a configuration. For instance, the vehicle wheel 1 size may be calculated from the car model and wheel DB 160 by inputting the size of the vehicle wheel 1 and the car model from the terminal 200. In this case, the input size of the vehicle wheel 1 may be different from the vehicle wheel 1 size calculated from the car model. In this instance, the vehicle wheel 1 size calculated from the car model is used (i.e., the size of the vehicle wheel 1 as input from the terminal 200 is neglected (not used)) and is then output (displayed) on the terminal 200.

Note that if the input size of the vehicle wheel 1 is different from the vehicle wheel 1 size calculated from the car model, it is possible to output (display), on the terminal 200, the fact that these sizes are not the same.

Also note that the above embodiment describes, as an example, the case where the additional air chamber member DB 150 and the car model and wheel DB 160 are separately constructed via the communication network N. However, the car model and wheel DB 160 may be built in the additional air chamber member DB 150.

Hereinabove, the embodiments of the present invention have been illustrated. However, the present invention is not limited to them and can be put into practice in various forms.

For instance, the above respective embodiments have been involved in the cases of preparing a set of four different resonators per size in inches of a wheel. The present invention is not limited to such a set of four different resonators, and a set of five or more different resonators or a set of three or less different resonators may be prepared.

REFERENCE SIGNS LIST 1, 1A Vehicle wheel
10, 10A Additional air chamber member (Resonator)
11 Rim
11a Bead seat
11c Well portion
11d Outer circumferential surface
12 Disk
13 Main body
18a Communication hole
100 Information processing device
101 Input reception section
102 Information output section
150 Additional air chamber member database
160 Car model and wheel database
200 Terminal
X Circumferential direction of the wheel
Y Width direction of the wheel
Z Radial direction of the wheel
SC Additional air chamber
MC Tire air chamber
S1 Step portion
S2 Step portion
SA, SB Additional air chamber member information site
N Communication network

The invention claimed is:

1. A method of configuring an additional air chamber on an outer circumferential surface of a well portion of a vehicle wheel as a Helmholtz resonator in a tire air chamber, comprising:
preparing, in advance of installing the additional air chamber to the vehicle wheel, a plurality of groups of additional air chambers, each group of additional air chambers corresponding to a predetermined size of the vehicle wheel, wherein each group of additional air chambers includes a plurality of additional air chambers, each having a different resonance frequency;
selecting, from the plurality of groups of additional air chambers, the group of additional air chambers which corresponds to a size of a particular vehicle wheel chosen by a user;
selecting, from the additional air chambers in the selected group, the additional air chamber in accordance with a size of a tire chosen by the user to be combined with the particular vehicle wheel, the additional air chamber having a resonance frequency corresponding to the size of the tire; and
installing the selected additional air chamber prepared in advance to the particular vehicle wheel.

2. The method according to claim 1, wherein the selected additional air chamber having the resonance frequency corresponding to the size of the tire is selected in accordance with an aspect ratio of the tire used in combination with the vehicle wheel.

3. The method according to claim 2, wherein corresponding resonance frequencies of the additional air chambers are set with an equal interval in frequency.

4. The method according to claim 2, wherein corresponding resonance frequencies of the additional air chambers are set with unequal intervals in frequency.

5. The method according to claim 4, wherein the interval of the corresponding frequency between the additional air chambers on a low frequency side is narrower than the interval on a high frequency side.

6. The method according to claim 4, wherein the interval of the corresponding frequency between the additional air chambers on a high frequency side is narrower than the interval on a low frequency side.

7. The method according to claim 1, wherein corresponding resonance frequencies of the additional air chambers are set with an equal interval in frequency.

8. The method according to claim 1, wherein corresponding resonance frequencies of the additional air chambers are set with unequal intervals in frequency.

9. The method according to claim 8, wherein the interval of the corresponding frequency between the additional air chambers on a low frequency side is narrower than the interval on a high frequency side.

10. The method according to claim 8, wherein the interval of the corresponding frequency between the additional air chambers on a high frequency side is narrower than the interval on a low frequency side.

* * * * *